H. E. REEVE.
FUEL REGULATOR.
APPLICATION FILED FEB. 11, 1913.

1,238,940.

Patented Sept. 4, 1917.
3 SHEETS—SHEET 3.

WITNESSES

INVENTOR
Henry E. Reeve,
ATTORNEY

UNITED STATES PATENT OFFICE.

HENRY E. REEVE, OF NEW YORK, N. Y.

FUEL-REGULATOR.

1,238,940.  Specification of Letters Patent.  Patented Sept. 4, 1917.

Application filed February 11, 1913. Serial No. 747,648.

*To all whom it may concern:*

Be it known that I, HENRY E. REEVE, a citizen of the United States of America, and residing at New York, in the county of Kings and State of New York, have invented new and useful Improvements in Fuel-Regulators, of which the following is a specification.

My invention relates particularly to thermostatic control of the gas supply for water heaters.

The object of the invention is to provide a sensitive and yet positive automatic control of the gas supply in what are commonly termed "automatic heaters."

My invention embodies in part a thermostatic device which acts in accordance with the temperature of the heater to control flow of fluid under pressure to a pressure actuated device and which device in turn operates certain valve mechanism to positively control the flow of gas to the burner. A special feature resides in the utilization of the gas, as the fluid under pressure for operating the pressure operated device. Of importance in this connection, I preferably provide a means for automatically releasing the pressure upon the pressure actuated device when the flow of actuating fluid thereto has been cut off.

Another feature of importance is the provision of means for cutting off flow of gas to the main burner in the event of the pilot becoming extinguished. Mechanism operated directly from the thermostat for automatically and positively cutting off flow of gas to the burner in the event of the heater becoming excessively hot or "overheating" is also a feature of this invention.

Another feature of considerable importance is a special form of gas-tight joint for the valve operating lever, which is in the form of a relatively flexible gas-tight diaphragm connecting the lever with the wall of the gas chamber into which the lever projects, the lever being projected into this chamber for the purpose of operating a valve therein.

A further feature is a special form of valve adapted to accurately and automatically seat itself. A specially sensitive form of thermostat also forms a part of the present invention.

Various other features will appear as the specification proceeds.

The accompanying drawings illustrate the invention in several of its preferred forms but I would have it understood that various other changes and modifications may be made therein without departing from the true scope of the invention.

A portion of the water chamber or reservoir of the heater is indicated at 15. 16 designates the gas supply pipe or conduit which supplies gas to the apparatus, and 17 is the conduit which conveys gas from the controlling apparatus to the main burner. The flow of gas to the main burner may be controlled directly by a main regulating valve 18 and a pressure operated device is preferably utilized as the means for positively operating this valve. The pressure operated device is here shown in the form of a diaphragm 19 mounted within a diaphragm chamber 20 and mechanically connected with the valve by means of a post 21 on the diaphragm which engages with one end of a pivoted lever 22 whose opposite end is connected with the valve. To properly regulate the rising and falling movement of the diaphragm with the closing and opening movement of the regulating valve, these parts, or the mechanical connections between are preferably made relatively adjustable. Such adjustment is in this case provided for by connecting the end of the lever adjustably to the diaphragm post, as by engaging it between the adjustable abutments 23, carried by the post (see Fig. 1). Also the connection between the diaphragm and valve is preferably made a more or less yielding one to permit a slight further movement of the diaphragm after the valve has been seated, so as to thereby hold the valve all the more firmly seated. The lever 22 is for this purpose, shown in Fig. 1, as provided with a spring end portion 24 which will yield to permit further upward movement of the diaphragm after the valve has been engaged with its seat 25.

While the pressure actuated device may be operated by any suitable fluid under pressure, I prefer to use the gas itself as the medium for operating the device. An auxiliary gas passage 26 is therefore preferably provided leading to the underside of the diaphragm, and flow of the actuating fluid is governed by an auxiliary gas valve 27 arranged to coöperate with the seat 28 at the end of such passage.

Figures 1, 2:
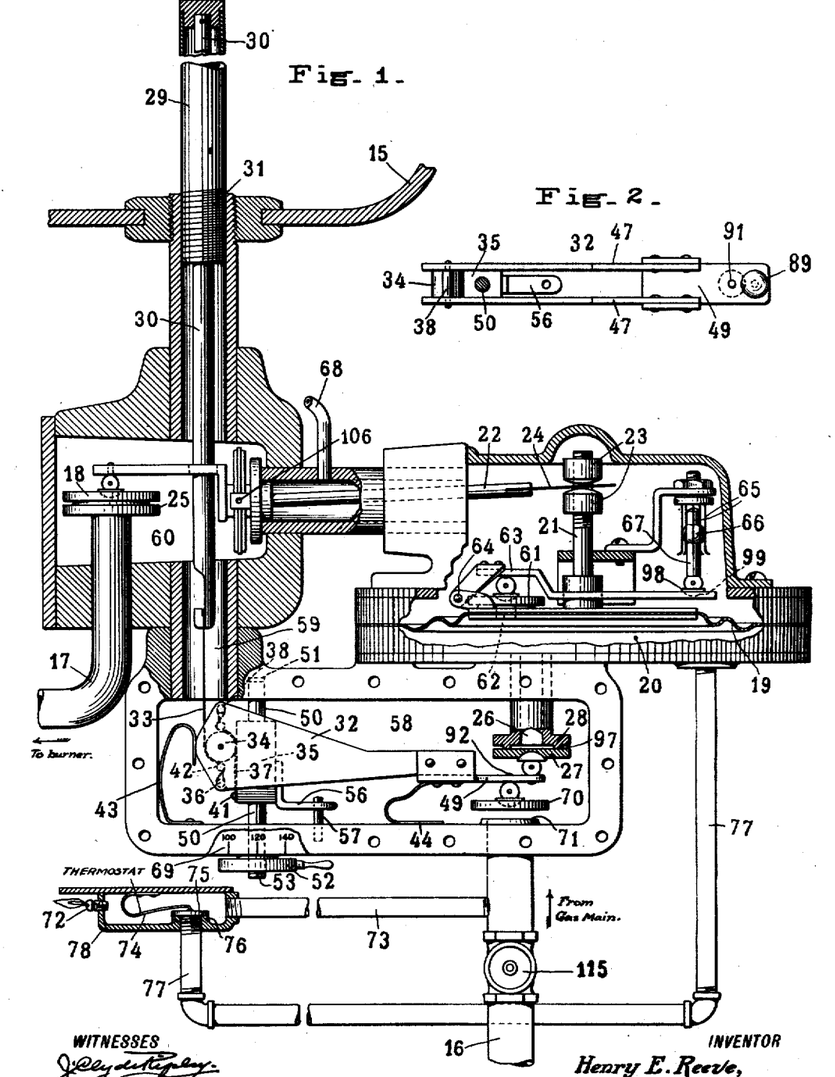
Figure 1, is a vertical sectional view of a preferred embodiment of the invention, parts being broken away.
Fig. 2, is a plan view of the lever member which carries the auxiliary gas valve and is operated by the thermostat.
Figures 3, 4:
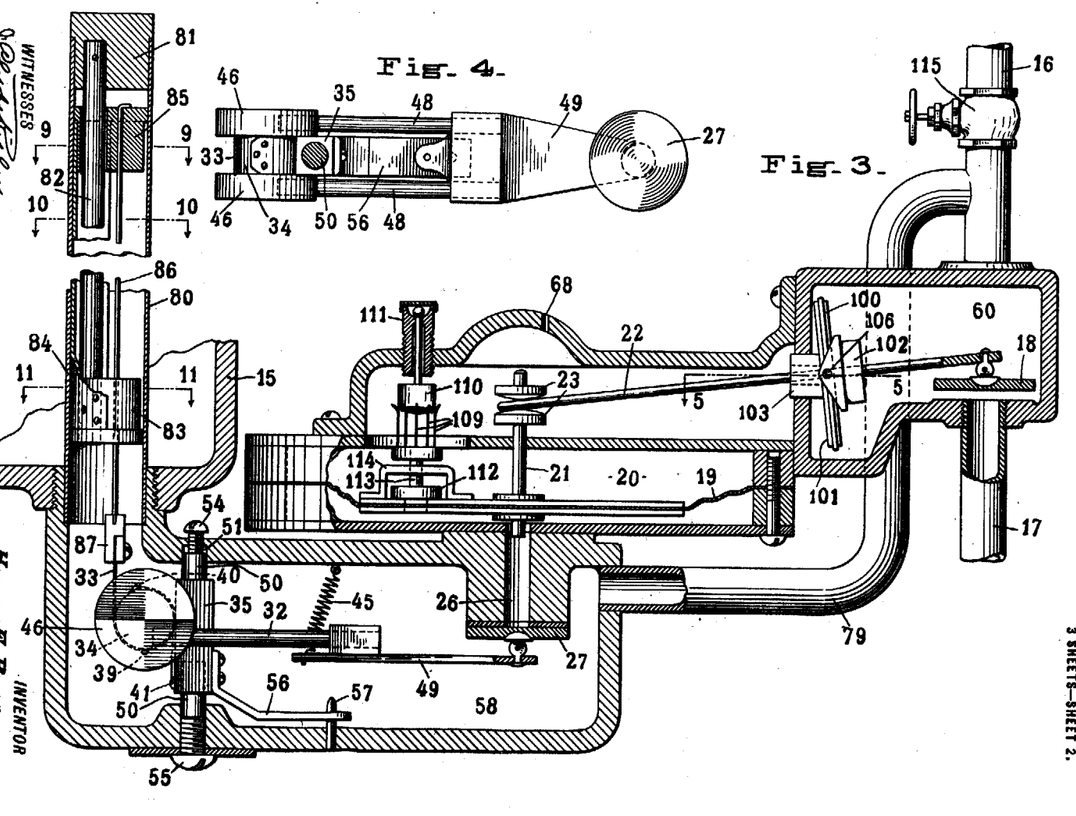
Fig. 3, is a view similar to Fig. 1 of a somewhat modified form of the invention.
Fig. 4, is a plan view of the lever member illustrated in Fig. 3.

A thermostatic device of some sort is provided for controlling operation of the pressure actuated device. In the first figure the thermostatic device is shown as consisting simply of a tube 29 extending up into the reservoir and having the rod 30 or like connection secured to the upper end thereof. The tube being made of brass or other material possessing a relatively high co-efficient of expansion, it will be clear that as the water in the reservoir becomes heated the tube will, since it is anchored at its lower end at 31, expand upwardly and lift the connection 30, while upon cooling of the water the tube will contract and lower the connection 30. The so-called auxiliary valve 27 which governs admission of the actuating fluid to the pressure operated device is mounted in any suitable way and it is here shown as carried on the end of an arm or lever 32 to the opposite end of which lever the thermostat rod is connected by a metallic tape or ribbon 33. The operating arm 32 is pivoted so as to be capable of the oscillatory movement necessary in the opening and closing of the auxiliary gas valve, and to reduce friction as much as possible and to eliminate lost motion I prefer to use a special form of pivot mounting at this point. This mounting consists of a roller 34 carrying the valve operating arm and making rolling engagement with a relatively fixed support 35, and a pair of flexible metallic tapes or ribbons, which pass in opposite directions each part way around the roller. The ends of these ribbons are fastened either directly or indirectly to the roller, so that the roller may be rotated thereby. In the form shown in Fig. 1, the ribbon 33 which comes from the thermostat extends downwardly part way around the roller and is secured in respect to the roller by having its end engaged over a pin 36 on the lever 32 and another ribbon 37, passes upwardly at the opposite side of the roller and part way therearound to where it is secured in respect to the roller by being engaged with the pin 38. The roller and lever are made fixed in respect to each other so it will be clear that the anchoring of the ribbons to the lever is the equivalent of fastening them direct to the roller. In Fig. 3 the ribbons are in fact shown secured to the roller at points 39 and 40. The second ribbon has its opposite end secured to the roller support, as indicated at 41. When made as in Fig. 1, I have provided guides 42 for holding the ribbons in proper engagement with the surface of the roller. The roller is in some way held in proper engagement with its support 35 and provision is made for rotating it in a direction reverse to that in which it is turned by the thermostat. In Fig. 1, a spring 43 is shown for holding the roller in proper engagement with its support and a second spring 44 is illustrated which acts upon the lever in opposition to the turning movement of the thermostat. In the form disclosed in Fig. 3, a single spring 45 performs both these functions, it being, as shown, connected with the lever so as both to lift the lever in opposition to the pull of the thermostat and to draw the lever over with the roller in engagement with the support. To prevent side slipping of the roller with respect to the support the roller may have flanges as indicated at 46 in Figs. 3 and 4 to engage over the sides of the support, or the place of these flanges may be taken, as shown in Figs. 1 and 2 by making up the lever with two side bars 47 to fit the opposite sides of the support. The lever shown in Figs. 3 and 4 also is preferably made up of two side bars 48 to pass on opposite sides of the support, but in this case the side bars do not contact with the support. Preferably also the valve lever has a more or less flexible end portion 49 which acts to hold the valve closed under a certain amount of spring tension.

To secure the proper coöperative action between the thermostat and the auxiliary valve, a certain amount of adjustment in the relation of these two parts may be necessary. This I provide for preferably by mounting the support so that it may be shifted to carry the valve on the valve lever 32 toward or away from its seat. Thus in Fig. 1 the support is made with rounded ends 50 guided in sockets 51, the actual shifting being accomplished by an adjusting nut 52 on the outer threaded end 53 of the support. In the form shown in Figs. 3 and 4 the support has rounded ends guided in sockets as before, but the shifting means in this instance consists of the screws 54 and 55 engaging with the upper and lower ends respectively of the support. The support may be held against rotative movement in any suitable way, such for instance, as by providing it with an outstanding arm 56 slidingly engaged over a fixed guide stud 57.

The operation of the parts thus far described will be best understood by reference to Fig. 1. Normally with the burner in operation, the flow of gas is from the supply pipe 16 through a passage formed by the gas chamber 58, connection 59 and valve chamber 60, to the main regulating valve and through conduit 17 to the burner. The thermostat, being subjected to the heat of the water in the reservoir, expands, thereby pulling upwardly on the ribbon 33 and rotating the roller and its attached lever, until finally at the predetermined temperature for which the thermostat has been set, the auxiliary valve 27 is carried away from its seat. Gas under pressure now flows through the auxiliary gas passage to the underside of the diaphragm. The diaphragm is lifted by this pressure of gas and thereupon acts to rock the lever 22 to close the main regulating valve. Further feed of gas to the burner is thus cut off. As the hot water is consumed or becomes cooled, the thermostat contracts, thereby releasing its upward pull on the ribbon 33 and the spring 44 acting in opposition to this pull then operates to close the auxiliary valve 27. This condition of the parts is represented in Fig. 1. Further supply of gas to the underside of the diaphragm is thus cut off and the slight leakage of gas causes a slight reduction in the pressure beneath the diaphragm. This reduction in pressure and the weight of the diaphragm itself tend to cause the diaphragm to descend. I preferably utilize this slight preliminary descending movement to operate certain mechanism for accelerating the movement of the parts. This accelerating mechanism is here shown in the form of a relief valve 61 carried on the diaphragm and arranged to normally close a relief opening 62 therein. This valve may be supported by a lever 63, pivoted at 64 on the diaphragm. At the time of the first preliminary descending movement of the diaphragm, the valve carrying arm is temporarily supported so that the diaphragm will fall away from the valve and thus open up the relief port 62. The means for thus temporarily sustaining the valve is in Fig. 1 a series of spring fingers 65, which engage frictionally with a knob 66, on the stud 67 carried by lever 63. The frictional engagement between these parts is sufficient to support the relief valve while the diaphragm is slowly settling, and the relief valve being thus held open, the gas beneath the diaphragm is allowed to suddenly escape. This escape of the gas permits the diaphragm to fall quickly and as it falls, it rocks the valve lever 22 downward and again opens the regulating valve for the main burner. The small amount of gas released from beneath the diaphragm may be allowed to escape to atmosphere or be otherwise disposed of through a vent 68. By adjusting the support for the valve carrying lever the amount of expansion in the thermostat necessary to open the auxiliary gas valve and hence the temperature at which the main burner will be cut off, may be determined at will. For convenience in setting the parts for different temperatures there may be provided a scale 69, laid off in degrees of temperatures.

To provide against overheating, the thermostat is preferably made to itself directly cut off flow of gas upon excessive heating. This may be conveniently accomplished by mounting a cut-off valve 70 on the valve lever 32 to coöperate with a valve seat 71 at the point where the gas supply pipe 16 opens into the gas chamber 15. If the heater should become excessively hot, as for instance, by reason of the pressure operated device failing to properly cut off flow to the main burner, then, the thermostat in expanding still further will turn the lever 32 and carry the valve 70 into engagement with its seat, thereby positively cutting off any further flow of gas to the burner. The seat for the auxiliary valve and the seat for the cut-off valve are disposed substantially opposite to each other so that the valve lever may vibrate therebetween to carry either one or the other valve to its seat. The parts are so proportioned and so disposed that only upon excessive heating will the lever be shifted far enough to close the cut-off valve.

As a further safeguard, means are preferably provided for shutting off flow to the main burner in the event of the extinguishment of the pilot. A means for this purpose is disclosed in Fig. 1, wherein 72 designates the pilot for the main burner, and 73 a branch conduit for supplying it with gas. Associated with this pilot and subject to the heat thereof is a thermostatic device 74 carrying a valve 75, which is arranged to engage a seat 76, and serves to control flow through a conduit 77 leading to the pressure operated device. The thermostatic device, which may be of the usual compound construction, is heated by the pilot so long as it is burning and in its expanded condition it serves to hold the valve 75 closed. When however the pilot is extinguished this thermostatic device cools off and lifts valve 75 from its seat. A flow of gas is now opened up from branch conduit 73 through the pilot casing 78, past the now open valve 75 and conduit 77 to the pressure actuated device which operates in the manner previously described to shut off flow to the main burner.

Figure 9:
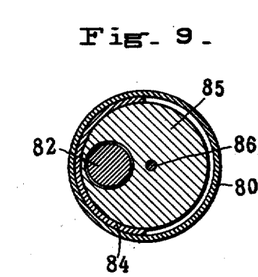
Fig. 9, is a horizontal sectional view of the thermostat shown in Fig. 3, this view being taken substantially on the line 9—9 of that figure.
Figure 10:
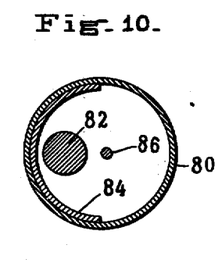
Fig. 10, is another sectional view of the same taken substantially on the line 10—10 of Fig. 3, and Fig. 11, is still another such view taken substantially on the line 11—11 of Fig. 3.
Figure 11:
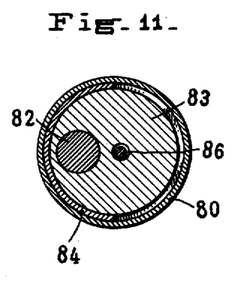

In Figs. 3 and 4 the apparatus is materially simplified by leaving out the pilot control of the main burner and the overheating protective device. In this case the gas simply flows from the supply conduit 16 direct through the valve chamber 60 to the conduit 17 leading to the burner and the gas for operating the diaphragm is taken off from the supply conduit through a branch conduit 79 which extends to the gas chamber 58 within which is located the auxiliary valve which controls flow to the diaphragm. The thermostat illustrated in this view and in detail in Figs. 9, 10 and 11 is extremely sensitive to change in temperature. It is made substantially as follows:—
A tube 80 for instance of brass, open at the bottom is secured at the bottom to a wall of the water reservoir. The upper end of this tube is closed by a plug 81 to which is secured the upper end of a rod 82 for instance of steel. The lower end of this rod carries a sleeve 83. A tubular or semi-tubular member 84 for instance of zinc, is secured to the sleeve 83 at its lower end, and at its upper end carries a second sleeve 85. This sleeve 85 is not attached to the tube 80 and has a free passage for the rod 82. The rod 86 for instance of steel, is secured to the sleeve 85 and passes freely through the sleeve 83 at the bottom. The zinc tube 84 has a high co-efficient of expansion and being in contact with the inner wall of the brass tube 80 receives by conduction through the tube, the heat of the water in the water container. As the temperature of the water rises, the tube 80 is elongated and carries with it the rod 82 and sleeve 83 and zinc tube 84 and the latter in turn is itself elongated giving an additional pulling movement to the sleeve 85 and the rod 86. The rod 82 and rod 86 are preferably of relatively nonexpansible material and it will also be noted that they are so spaced apart throughout the principal part of their ranges from the tubes that they are but little affected by changes of temperature and therefore but little, if any, detract from the effective movement of the brass and zinc tubes. The rod 86 may be connected to the tape 33 which operates the roller by means of a suitable coupling 87.

Figure 7:
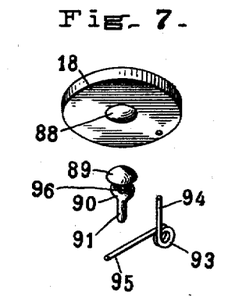
Fig. 7, is a detail perspective view showing the various parts of the preferred form of gas valve.
Figure 8:
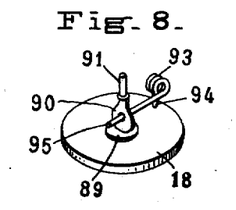
Fig. 8, is a similar view of these parts as assembled.

To insure the valves always seating properly they are preferably each mounted on a universal joint so that they may automatically adjust themselves to their respective seats. The preferred form of such joint is illustrated in detail in Figs. 7 and 8. In these views the main regulating valve 18 is shown provided with a partially spherical recess 88, on the back thereof into which fits a correspondingly spherical head 89 on the bearing member 90. This bearing member is suitably attached to the element which supports the valve which in the case described is the valve operating lever 22. The usual method of attachment is to pass the stem 91 of the bearing member into an opening in the supporting member and rivet it therein as indicated at 92, Fig. 1. The head of the bearing member is by suitable means held in engagement with the spherical recess in the back of the valve—such means being illustrated as a coil spring 93 having one of its arms 94 secured in the body of the valve and its other arm 95 engaging the bearing member as by passing freely through an opening 96 therein. The valve plate is thus supported so that it may move freely in all directions to a limited extent, as a result of which it will adjust itself automatically to always make firm engagement with its valve seat. All of the valves are preferably mounted in this same way. A firm and secure seating of the valves is further facilitated by making the valve seat in the form of an upstanding annular ridge 97 as shown in the case of the auxiliary valve 27 in Fig. 1. The same form of universal mounting which is used for the valves may also be employed in connecting the stud of the temporary supporting device to the lever which carries the pressure releasing valve of the diaphragm. Thus as shown in Fig. 1 the stud may be made with a rounded head 98 for engagement with a spherical recess 99 in the valve carrying lever 63. The stud thus forms a bearing member similar in function to the bearing member of the valves, and the rounded head of this member may be held in engagement with the recess by a spring 93, the same as in the case of the valves.

Figure 5:
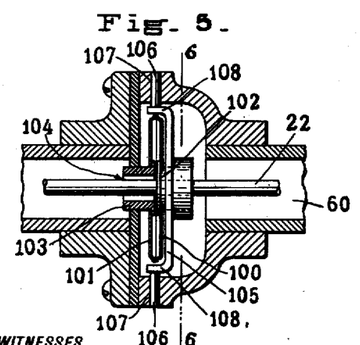
Fig. 5, is a horizontal sectional view taken substantially on the line 5—5 of Fig. 3, illustrating the gas-tight joint and the pivot mounting for the lever which operates the main valve.
Figure 6:
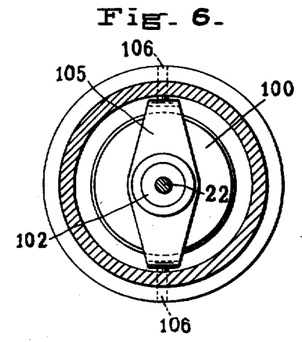
Fig. 6, is a sectional view taken on a plane at right angles to that of Fig. 5 and substantially on the line 6—6 of Fig. 5.

To prevent leakage at the joint where the valve operating lever 22 passes into the valve chamber 60 of the main regulating valve, I have devised a special form of gas tight joint, shown in detail in Figs. 5 and 6 and consisting in substance of a flexible diaphragm connected between the lever and the wall through which the lever passes. This diaphragm is preferably made up of two thin metallic disks 100 and 101 interconnected at their edges and connected at their central portions to the lever and the supporting wall respectively. The disk 100 is joined to the lever preferably by securing it to a bushing 102 fast on the lever and the disk 101 is preferably connected to a bushing 103 mounted in the supporting wall. The opening 104 through which the lever passes is, it will be noted, of a size sufficient to permit free movement of the lever. The lever is in this way pivotally supported in a manner which is substantially frictionless. To prevent sidewise movement of the lever and to limit its pivoting movement to a single plane—that is to a straight up and down rocking movement, I preferably provide guiding means in the form of a horizontally disposed yoke 105 engaged at its center with the lever and having pivots 106 at its opposite ends engaged in suitable bearings 107. This yoke may, as shown, be connected to or form a part of the bushing 102. The pivots of the yoke are preferably disposed in the same plane with the diaphragm so as to substantially coincide with the line of flexure of the diaphragm, the yoke being for this purpose off-set as indicated at 108 to bring the pivots into this plane.

A slight variation in the manner of temporarily supporting and opening the pressure releasing diaphragm valve is indicated in Figs. 3 and 4. In this case the relation of the parts is reversed, the spring fingers 109 being connected to the valve and the catch member 110 for engagement with these fingers being supported apart from the valve. Such support is shown as an adjustable sleeve 111. In this case the valve carrying lever 63 is dispensed with, the pressure releasing valve, here designated 112, being simply provided with a spindle 113 guided in a yoke 114 and carrying the spring fingers on its upper end. In this form when flow to the diaphragm is shut off and the diaphragm begins to descend it moves away from the diaphragm valve 112 which is frictionally held by the spring fingers 109 engaging the catch member 110. This opens the relief port and allows a quick escape of the gas from beneath the diaphragm so that its movement and the movement of the main regulating valve is accelerated. As the diaphragm carries the yoke 114 downward with it, the yoke engages the diaphragm valve and pulls it and the spring fingers downward away from engagement with the catch member so that the valve 112 again closes the relief port. Since the normal pressure of gas is only slightly above atmospheric pressure, the weight of the valve 112 and attached parts is sufficient to keep it closed normally.

Suitable means may be provided for manually cutting off the flow of gas to the apparatus. Such means is here illustrated in the form of the hand valve 115.

What I claim is:—

1. In a water heater, a reservoir, a main gas burner for heating the same, pressure actuated means controlling said main burner, thermostatic means subjected to the heat of the reservoir for controlling flow of gas to the main burner, a pilot for the main burner and thermostatic means subjected to the heat of the pilot for controlling flow of actuating fluid to the pressure actuated means which controls the main burner.

2. In a heater regulating system, the combination with the reservoir and a suitable gas burner for heating the same, of a main gas regulating valve, a gas operated diaphragm, a mechanical connection between said diaphragm and said valve, a valve in said diaphragm, a gas supply passage leading to the opposite side of said diaphragm, an auxiliary gas valve for said passage and heat controlled means for operating said auxiliary valve.

3. In a heater regulating system, a reservoir and a suitable gas burner for heating the same, means controlling flow of gas to the burner, a pressure operated device controlling the burner controlling means and arranged when actuated by fluid under pressure to cut off flow of gas to the burner, a thermostatic device controlling flow of fluid under pressure to the pressure operated device and arranged in one position to cut off flow of actuating fluid to said device and means adapted to release the pressure upon the pressure operated device when the flow of actuating fluid thereto is thus cut off.

4. In a gas regulating device, a main gas valve, a diaphragm mechanically connected with said valve and having a gas passage therein, a valve for said passage at one side of said diaphragm and carried by said diaphragm and a heat operated auxiliary valve for controlling the flow of gas to the opposite side of said diaphragm.

5. In a gas regulating device, a main gas valve, a diaphragm mechanically connected with said valve and having a gas passage therein, a valve for said passage carried by said diaphragm, a heat operated auxiliary valve for controlling the flow of gas to said diaphragm and means for engaging said diaphragm valve to hold it and permit said diaphragm to descend a certain distance independently of such valve.

6. In a gas regulating device, a main gas valve, a diaphragm mechanically connected with said valve and having a gas passage therein, a valve for said passage carried by said diaphragm, a heat operated auxiliary valve for controlling the flow of gas to said diaphragm, means for engaging said diaphragm valve to hold it and permit said diaphragm to descend a certain distance independently of such valve and means for disengaging said diaphragm valve in the latter part of the downward movement of the diaphragm.

7. In a regulating device, the combination of a water reservoir, a heat operated device for said reservoir, a roller, a support for said roller, a flexible metallic ribbon connecting said roller to said support, a flexible metallic ribbon connecting the roller to a part of the heat controlled device aforesaid, an operating lever connected to the roller and means actuated by said lever.

8. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, means operated by said lever and means for adjusting the support for the roller.

9. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, means operated by said lever and a spring opposing the operation of the heat operated device.

10. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller and a valve connected to said operating lever.

11. In a regulating device, the combination of a water reservoir, a heat operated device for said reservoir, a roller, a support for said roller, a flexible metallic ribbon connecting the roller to said support, a flexible metallic ribbon connecting the roller to a part of the heat controlled device aforesaid, an operating lever connected to the roller, a valve connected to the operating lever and a spring normally tending to close said valve.

12. In a device of the character set forth, the combination of a support, a roller bearing against said support, an operating arm carried by the roller, means operated by said arm, a flexible ribbon passing part way around the roller and connecting the roller to the support, a second flexible ribbon passing part way around the roller in a direction opposite to that of the first ribbon and a controlling device connected to the second ribbon for imparting rotative movement to the roller and the operating arm carried thereby.

13. In a heater regulating system, a water reservoir and a suitable main gas burner for heating the same, means controlling flow of gas to the main burner, a pressure actuated device for operating said controlling means, a pilot for the main burner and means adapted upon extinguishment of the pilot light to admit fluid under pressure to the pressure actuated device whereby to cause said device to operate the controlling means to cut off flow of gas to the main burner.

14. In a heater regulating system, a water reservoir and a suitable main gas burner for heating the same, means controlling flow of gas to the main burner, a pressure actuated device for operating the controlling means arranged upon admission of fluid under pressure thereto to operate the controlling means to cut off flow of gas to the main burner, a thermostatic device heated by the reservoir, means operated by the thermostatic device when heated to admit fluid under pressure to the pressure actuated device, a pilot for the main burner and a thermostatic device heated by the pilot, adapted upon extinguishment of the pilot to admit fluid under pressure to the pressure actuated device.

15. In a heater regulating system, a water reservoir and a suitable main burner for heating the same, a main regulating valve controlling flow of gas to the burner, a diaphragm operatively connected to the main valve, an auxiliary valve controlling flow of gas to the diaphragm for operating the same, a thermostatic device subjected to the heat of the reservoir, connected with the auxiliary valve and adapted on a rise in temperature to open the auxiliary valve to admit gas to the diaphragm, a pilot for the main burner, a gas passage leading to the diaphragm and a themostatic device subjected to the heat of the pilot, adapted when heated thereby to cut off flow through such passage and when cooled to open up flow through said passage.

16. In a device of the character set forth, the combination with a suitable gas burner, of a main regulating valve controlling said burner, a gas pressure operated device connected with said valve for operating the same, an auxiliary gas passage leading to said pressure operated device, a main gas passage leading to the main regulating valve, a thermostatic device and valve mechanism controlled by the thermostatic device for governing flow through the auxiliary gas passage and main gas passage.

17. In a device of the character set forth, the combination of a gas burner, a main regulating valve controlling said burner, a gas pressure operated device connected with said valve for operating the same, an auxiliary gas passage for supplying gas under pressure to the pressure operated device, a main gas passage leading to the main regulating valve, valve mechanism controlling flow through the auxiliary gas passage and through the main gas passage, and a thermostatic device connected with the said valve mechanism adapted under the influence of heat to first open up flow through the auxiliary gas passage and thereafter to decrease flow through the main gas passage.

18. In a device of the character set forth, the combination of a gas burner, a main regulating valve controlling said burner, a gas pressure operated device connected with the regulating valve for controlling the same, a gas chamber, a gas supply conduit opening into said chamber, an auxiliary gas passage extending from the interior of said chamber to the pressure operated device and disposed substantially opposite to the opening of the supply conduit thereinto, a lever pivoted in the gas chamber, oppositely seating valves mounted on one end of the said lever and arranged to control the main and auxiliary gas passages respectively and a thermostatic device connected with the opposite end of the lever for operating the same.

19. In a heat controlled device, the combination of a water reservoir, a metallic tube supported at its lower end by said reservoir, a rod of relatively low co-efficient of expansion having one end secured to the inner end of said tube, an intermediate member of high co-efficient of expansion having one end secured to the free end of said rod and lying in contact with the inner surface of said tube between said rod and said tube, a transmitting member secured to the inner end of said intermediate member and passing through the outer end of said tube and means operated by said transmitting member.

20. In a device of the character set forth, the combination with a suitable burner, of a main regulating valve therefor, a pressure operated device connected with the main regulating valve for operating the same, a thermostatic device, means operated by said thermostatic device to control flow of fluid under pressure to the pressure operated device, whereby to control the burner through the medium of the pressure operated device and means operated by the thermostatic device adapted under excessive heat conditions to cut off flow of gas to the burner, whereby the thermostatic device will upon excessive heating act directly to reduce flow of gas to the burner independently of the control exercised by the pressure operated device.

21. In a device of the character set forth, having a chamber, a diaphragm forming a wall thereof and provided with a valve passage, a valve carried by the diaphragm and controlling said passage, means for controlling the admission of fluid under pressure to the diaphragm chamber, whereby to cause movement of the diaphragm in one direction, spring fingers engaging the valve to temporarily hold the same while the diaphragm is moving in the opposite direction and means operated by said diaphragm.

22. In a device of the character set forth, having a chamber, the combination of a diaphragm forming a wall thereof and provided with a valve passage, a lever pivoted on the diaphragm, a valve carried by said lever and controlling the passage in the diaphragm, means for controlling the admission of fluid under pressure to the diaphragm chamber to cause movement of the diaphragm in one direction, spring fingers arranged to temporarily hold the lever whereby to hold the valve open when the diaphragm is moving in the opposite direction and means operated by said diaphragm.

23. In a device of the character described, having a chamber, the combination of a diaphragm forming a wall thereof, means for controlling the admission of fluid under pressure to said diaphragm chamber, means operable by said diaphragm, a valve for controlling the flow of gas from one side of the diaphragm to the other and means for opening the valve when the diaphragm starts to collapse, said means including a plurality of spring fingers for retarding movement of said valve.

24. In a device of the character described, having a chamber, the combination of a diaphragm forming a wall thereof, means for controlling the admission of fluid under pressure to said diaphragm chamber, means operable by said diaphragm, a valve for controlling passage of gas from one side of the diaphragm to the other and means for causing a sudden opening movement of the valve when the diaphragm starts to collapse, said means including a spherically surfaced member and a plurality of spring fingers for engaging the same.

25. In a device of the character described, having a chamber, the combination of a diaphragm forming a wall thereof, means for controlling the admission of fluid under pressure to said diaphragm chamber, means operable by said diaphragm, a valve controlling the passage of gas from one side of said diaphragm to the other, and means for automatically opening the valve when the diaphragm begins to collapse.

26. In a water heater, a main burner, a main regulating valve controlling the flow of gas to the main burner, a diaphragm operatively connected to said valve, an auxiliary valve controlling the flow of gas to the diaphragm, a thermostat subjected to the heat of the water and operatively connected with the auxiliary valve, a pilot for the main burner having a gas passage leading to said diaphragm and a thermostatic device controlled by the operation of the pilot for controlling the flow of gas through said passage to said diaphragm for operating the diaphragm to shut off the main valve upon extinguishment of the pilot.

27. In an apparatus of the character described, having a chamber, the combination of a main gas valve, a diaphragm forming a wall of the chamber and mechanically connected to said valve for operating the same, a valve controlling the flow of gas from one side of the diaphragm to the other, said latter valve being operated by the movement of said diaphragm, means for engaging said latter valve to hold it and permit the diaphragm to collapse a certain amount independently of the valve and a heat operated auxiliary valve for controlling the flow of gas to said diaphragm.

28. The combination in a water heater of a main gas regulating valve, a diaphragm operatively connected to said valve and operated by gas pressure, a valve operated by the movement of the diaphragm for controlling the flow of gas from one side of the diaphragm to the other, an auxiliary valve controlling the flow of gas to the pressure side of said diaphragm and a heat operated device for operating said auxiliary valve.

HENRY E. REEVE.

Witnesses:
R. S. ALLYN,
E. BRADFORD.